K. A. KENDRICK.
SPRING VEHICLE WHEEL.
APPLICATION FILED AUG. 21, 1911.

1,071,926.

Patented Sept. 2, 1913.

Witnesses
O. B. Baenziger,
J. Otto Baenziger.

Inventor
Karl A. Kendrick
E. S. Wheeler,
Attorney.

UNITED STATES PATENT OFFICE.

KARL A. KENDRICK, OF DETROIT, MICHIGAN.

SPRING VEHICLE-WHEEL.

1,071,926.   Specification of Letters Patent.   Patented Sept. 2, 1913.

Application filed August 21, 1911. Serial No. 645,062.

*To all whom it may concern:*

Be it known that I, KARL A. KENDRICK, a citizen of the United States, residing at Detroit, in the county of Wayne, State of Michigan, have invented certain new and useful Improvements in Spring Vehicle-Wheels; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to new and useful improvements in spring vehicle wheels, and consists in the construction and arrangement of parts hereinafter more fully set forth and pointed out particularly in the claim.

The object of this invention is to provide a vehicle wheel of the character described, of comparatively simple and inexpensive construction, in which the arrangement is such as to combine strength with resiliency.

The above object is attained by the structure illustrated in the accompanying drawings, in which:—

Figure 1:
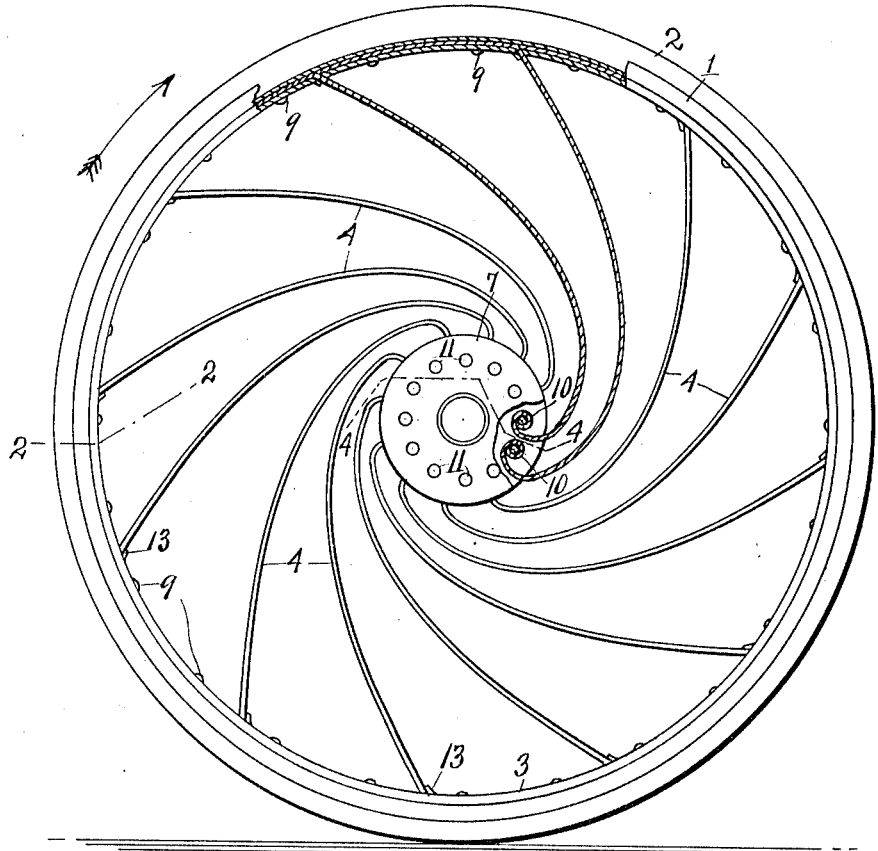
Figure 2:
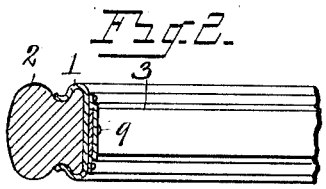
Figure 4:
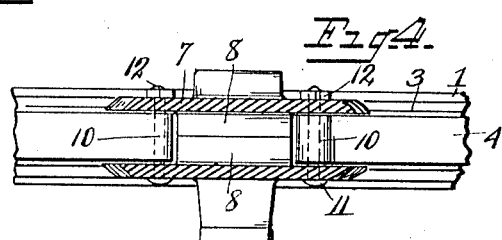
Figure 5:
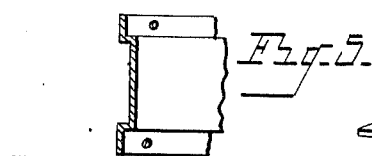
Figure 3:
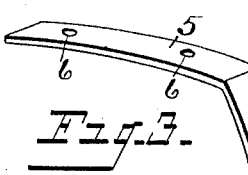

Figure 1 is an elevation partly in section showing a spring vehicle wheel embodying my invention. Fig. 2 is a fragmentary view in cross section as on line 2—2 of Fig. 1. Fig. 3 is a fragmentary view in perspective of the outer end of one of the spokes, showing the curved foot portion which is attachable to the rim. Fig. 4 is a fragmentary view in cross section through the hub of the wheel as on line 4—4 of Fig. 1. Fig. 5 is a transverse section through the channeled ring which is employed to secure the spokes to the rim.

Referring to the characters of reference, 1 designates the rim of the wheel, which is preferably in the form of a channel, and between the sides of which is seated a rubber tread 2. Secured to the inner face of the rim is a channeled ring 3, under which are secured the outer ends of the spokes 4. The spokes are formed of strips of suitably tempered spring metal, and each spoke at its outer end is provided with a foot portion 5, curved concentric with the rim of the wheel and adapted to lie upon the inner face of said rim under the raised central portion of the ring 3, said foot portion being pierced as shown at 6 to receive the fastening rivets which are employed to attach the spokes to the rim. The hub of the wheel is composed of the opposed circular disks 7, each having an annular extending flange 8 concentric with the axis thereof. These flanges of the disks 7 abut when the parts are in position in the wheel and serve to hold said disks in parallel relation a predetermined distance apart. The channeled ring 3 is slotted at intervals transversely of the raised central portion, and the spokes 4 pass through said slots, the terminal portion 5 of said spokes lying under the raised central portion of the ring and receiving the rivets 9 which secure the ring and spokes to the rim.

The spokes curve laterally in a continuous sweep and each spoke at its inner end is provided with a scroll which is connected to the hub, as clearly shown in Fig. 1. Each of the spokes at its inner end is provided with an eye 10, formed at the end of its curve terminal and adapted to lie between the inner faces of the disks of the hub. The inner ends of the spokes are secured to the hub by means of transverse bolts 11, which pass through the disks of the hub and through the eyes of the spokes, receiving on their threaded ends the nuts 12. By this arrangement a pivoted connection is made between the hub and the spokes.

Through the medium of the construction herein shown the hub becomes flexibly suspended in the rim in a manner to absorb the shocks and jars incident to the rolling of the wheel over a road surface, while the form of the spokes is such as to bring into play the tensile strength thereof, because of the tangential connection with the hub, when power is applied to the axle to rotate the wheel.

In slotting the channeled ring 3 to permit of the passage of the spokes therethrough a marginal portion of the slot is turned upwardly as shown at 13 to lie on the spoke at the point of the passage of the spoke through said ring, thereby bracing the spoke at its point of connection with the rim.

Having thus fully set forth my invention, what I claim as new and desire to secure by Letters Patent, is:—

A spring wheel comprising a rim, a ring having a raised central portion secured to the inner face of said rim, the raised portion of the ring having transverse slots at intervals therein and each slot having an upwardly extending marginal portion, flexible spokes whose outer terminals pass through said slots and engage said extending marginal portions, the inner ends of said spokes describing a scroll and being provided with transverse eyes, hub disks embracing the terminal eyes of the spokes, and bolts passing transversely through said disks and through said eyes.

In testimony whereof, I sign this specification in the presence of two witnesses.

KARL A. KENDRICK.

Witnesses:
MARIE BROESAMLE,
E. S. WHEELER.

Copies of this patent may be obtained for five cents each, by addressing the "Commissioner of Patents, Washington, D. C."